United States Patent Office 3,489,606
Patented Jan. 13, 1970

3,489,606
SUGAR EXTRACTION
Derk Th. A. Huibers, Berkeley Heights, N.J., assignor to The Lummus Company, New York, N.Y., a corporation of Delaware
No Drawing. Filed Dec. 28, 1965, Ser. No. 517,119
Int. Cl. C13c *1/02;* B01k *1/00*
U.S. Cl. 127—42                                   9 Claims

ABSTRACT OF THE DISCLOSURE

Process for preparing a sugar-containing vegetable material for the subsequent extraction of sugar wherein the vegetable material is subjected to high energy radiation for a total dosage of 0.5–5.0 megarads.

---

This invention relates to the extraction of sugars from vegetable cells and, more particularly relates to the extraction of sugars from sugar cane and sugar beets.

Sugar is commercially recovered from sugar beets and sugar cane, and is contained within the cells constituting such vegetable matter. Specifically, sugar is contained within the vacuole of the cell which is surrounded by diverse layers which may be considered the cell wall. Starting from the boundary with the adjacent cells, a cell wall is generally comprised of: (1) a thin center lamella comprised of pectins and hemicellulose; (2) a very thin primary cell wall comprised of cellulose, hemicellulose and pectins; (3) a relatively thick secondary cell wall comprised of cellulose fibrils (100 angstrom diameter) embedded in hemicellulose, pectin and lignin; and (4) protoplasm comprised of proteins and a lipoid layer. The protoplasm is semi-permeable for saccharose molecules, and consequently, must be destroyed in order to recover sugar from such vegetable material.

In accordance with one method, the protoplasm of sugar beets are destroyed by heating the sugar beets to a temperature of from 70° to about 80° C. during passage through a plurality of diffusion vessels. At such temperatures, however, proteins and pectins are also extracted with the result that products of hydrolytic decomposition are formed during extraction. The diffusion liquid is agitated with lime after which carbon dioxide is introduced until saturation of the liquid is attained to effect precipitation of the impurities. The solution is passed through a filter and treated with sulfur dioxide to improve the color of the liquid and to decompose some organic salts. The resulting solution is then ready for further processing to form raw sugar.

To reduce extraction of proteins and pectins, and thus the concentration of hydrolytic decomposition products during passage through the diffusion vessels, sugar has been extracted utilizing cold temperature diffusion techniques where the protoplasm of the cells of the sugar beets are chemically destroyed by using agents with narcotic properties, such as sulfur dioxide. While purer sugar solutions and better pulp quality resulted, a greater amount of molasses by-product was formed as a result of the ion exchange between cell walls and extraction liquid thereby forming a crude extract with a higher ash content. Additionally, relatively low pH values during extraction made is necessary to employ expensive, corrosion resistant materials in the process equipment.

Chloroform has been also used as an effective narcotic agent together with small amounts of sulfur dioxide to impart desirable color to the crude extract and pulp. The use of chloroform eliminated many of the disadvantages of sulfur dioxide alone.

Sugar is also recovered from sugar cane by subjecting shredded sugar cane to a force of from 300 to 600 tons in the presence of a milling liquid, such as water. Under such conditions, the vegetable cells are ruptured and raw sugar juice is recovered for further treatment. Lime is added to the raw sugar juice in an amount sufficient to raise the pH of the solution to about 7.6 to 7.8. The solution is then quickly heated to effect the precipitation of diverse substances, such as calcium phosphates and calcium sulfates. Occluded within such precipitate is a large proportion of the colloidal impurities. Additionally, insoluble proteinates are formed which are readily removed during clarification. The solution may then be treated to form raw sugar.

It is an object of the invention to provide an improved process for recovering sugar from vegetable matter containing the same.

Another object of the invention is to provide an improved process for extracting sugar from vegetable matter containing the same whereby chemical consumption during clarification is substantially reduced.

A further object of the invention is to provide an improved process for treating vegetable matter containing prior to extraction of the sugar such vegetable matter whereby extraction is facilitated by such treatment.

Still another object of the invention is to provide an improved process for recovering sugar from a vegetable source containing the same whereby the capacity of a plant may be substantially increased.

Other objects and advantages of the invention will be apparent from the following description.

In accordance with the present invention, a vegetable material, such as sugar cane or sugar beets, is subjected to a source of high energy radiation prior to extraction of the sugar from such vegetable material. The high energy radiation destroys the semi-permeability of the protoplasm of the vegetable cell thereby facilitating the extraction of the sugar. Additionally, the resulting sugar and the vegetable pulp are not contaminated with chemicals previously employed to treat such vegetable materials prior to extraction.

High energy ionizing radiation from any suitable source is used herein, provided it is sufficiently energetic and penetrating as to be able to generate states of excitation in the vegetable cells. Further, the source of high energy radiation must also provide "clean" radiation so that the irradiated material is not radioactive or does not remain radioactive. Such radiation is inteneded to embrace both ionizing particle radiation and ionizing electromagnetic radiation; the former includes accelerated electrons, nuclear particles like protons, alpha and beta particles, deuterons, fission fragments, and the like; and the latter includes gamma rays and X-rays. The usual safety precautions should be observed dependent on the radiation source having regard to the different penetration power of the various types of radiation. Additionally, depending on the penetration power, the distance between the source and vegetable material must be varied, i.e., if the radiation source is less penetrating, it should be brought nearer the vegetable cells and/or the depth of the latter reduced, and vice versa.

The foregoing types of radiation may be obtained from various sources including natural radioactive materials, which emit alpha and beta particles, and gamma rays; from by-products of nuclear fission in which atomic power is generated, these by-products including elements having atomic numbers ranging from 30 to 63; from materials made radioactive by exposure to neutron radiation, such as cobalt-60, cesium-137, sodium-24, manganese-56, gadolinium-72, lanthanum-140; etc.; or from operating nuclear reactors. The charged particles may be brought to high energy levels by acceleration in conventional devices. For example, high speed electrons having energies of 0.5 to 15 mev. can be supplied by Van der Graaf generators, resonant transformers, linear accelerators, etc. High energy X-ray machines are a source of X-rays.

As used herein, radiation dosage means the amount of energy absorbed by a material from a radiation source. The unit "rad" represents radiation dose which is absorbed, equal to 100 ergs. of energy per gram of the tissue medium. As an approximation, one rad is equivalent to 1.2 roentgens.

The vegetable material treated in accordance with this invention should be provided with a radiation dosage generally greater than about 0.1 megarads. Preferably, the radiation dosage should be within the approximate range of about 0.5 to about 5.0 megarads.

The vegetable materials which are a source of sugar and which may be treated in accordance with this invention include sugar cane and sugar beets.

In accordance with the invention, the sugar cane or sugar beets are first preferably sub-divided prior to passage to a suitable radiation source to receive the required radiation dosage. In the case of sugar cane, the cane is first cut into short lengths while in the case of sugar beets, the beets are cut into V-shaped slices. The subdivided sugar cane or sugar beets are placed on a conveyor belt and passed through a source of high energy radiation, as hereinbefore discussed. Radiation dosages will range between about 0.5 to about 5.0 megarads which can be imparted to the vegetable material in time intervals of from 0.1 to 10 seconds. The radiation-treated sugar cane is then passed to a milling train for extraction of the sugar with water. With radiation-treated sugar beets, the sugar beets are passed to a battery of diffusion cells for extraction of the sugar.

The process of the present invention is illustrated by the following example.

EXAMPLE

Sugar beets containing on the average of 15.0 percent by weight of sugar are topped, washed and cut into V-shaped slices having a silin number of 35. The silin number is an expression for the thickness of a slice defined as the length in meters per 100 grams of sliced beets. The sugar beet slices fall onto a conveyor belt two feet wide and pass to a 12 kw. industrial electron accelerator having a standard 1" x 2' scan. With a beam current of 20 ma., a scan rate of 10 cycles per second and a belt velocity of 650 feet per minute, the radiation dosage is about one megarad. A production rate of about 4800 pounds per hour is attained with a beam utilization of fifty percent. Since some of the juice is released when the cell is destroyed during passage through the radiation accelerator, the conveyor belt is preferably convex shaped.

The radiation-treated sugar beets are passed into a battery of ten diffusion cells having a volumetric capacity of 150 gallons. A cell is filled with 640 pounds of treated beet slices in eight minutes. Water having a temperature of 40° C. is percolated countercurrently through the cells with 81 gallons of juice being withdrawn from the last cell. To the juice there was added 0.3 percent by weight lime to precipitate unwanted byproducts. Filtration was easily effected in a standard filter press with the resulting filtrate being substantially free of proteins and pectins. The filtrate was then conventionally processed to produce raw sugar.

Since the diffusion juice contained about 30 percent of the proteins and about 40 percent of the pectins as compared with the concentrations of such substances found in juices of hot water diffusion processes, the overall consumption of lime is about 15 percent of that required for standard processes. In fact, the juice filtrate according to the invention was comparable to the first carbonation juice of conventional sugar beet extraction processes. Radiation also decreased the volume of the beet slices by about 30 percent thus increasing the potential capacity of a given plant by 30 percent.

The residual sugar content of the beet pulp averaged about 0.3 percent by weight indicating that 98.0 percent by weight of the sugar was extracted from the sugar beets. The pulp contained on the average 7 percent more solids than pulp obtained in known processes using water at a temperature of 80° C. The nitrogen content of the pulp (Kjeldahl method) was 12 percent higher, thus providing a cattle feed having a considerably increased feed value.

It is to be understood that various modifications will readily become apparent to those skilled in the art upon reading of this description. All such modifications are intended to be included within the scope of the invention as defined by the appended claims.

I claim:
1. In a process for treating a vegetable material containing sugar, to prepare said material for the subsequent extraction of sugar, the step which comprises subjecting the vegetable material to high energy radiation to effect a radiation dosage of at least about 0.1 megarad.

2. The process defined by claim 1 wherein the vegetable material comprises sugar cane.

3. The process defined by claim 1 wherein the vegetable material comprises sugar beets.

4. The process defined by claim 1 where the vegetable material is irradiated by an electron accelerator.

5. The process defined by claim 1 wherein the vegetable material is irradiated by cobalt 60.

6. The process defined by claim 1 wherein the radiation dosage ranges from about 0.5 to about 5.0 megarads.

7. The process defined by claim 1 including the additional step of separating sugar from the radiation-treated vegetable material.

8. The process as defined in claim 1 wherein the vegetable material is in sub-divided form.

9. The process as defined in claim 1 wherein the vegetable material is in sub-divided form, the radiation dosage is between about 0.5 and about 5.0 megarads and the dosage is applied in intervals of between about 0.1 and about 10 seconds.

References Cited

UNITED STATES PATENTS

| | | | |
|---|---|---|---|
| 2,602,751 | 7/1952 | Robinson | 21—54 X |
| 2,897,365 | 7/1959 | Dewey et al. | 21—54 X |
| 2,981,267 | 4/1961 | Stoddard. | |
| 3,197,640 | 7/1965 | Speas | 21—54 X |
| 3,218,188 | 11/1965 | Lippe et al. | 127—4 |

MORRIS O. WOLK, Primary Examiner

D. CONLIN, Assistant Examiner

U.S. Cl. X.R.

127—43; 204—165